United States Patent
Kane

[11] 3,944,050
[45] Mar. 16, 1976

[54] GRAVIMETRIC FEEDER

[75] Inventor: Edward Kane, Millville, N.J.

[73] Assignee: K-Tron Corporation, Glassboro, N.J.

[22] Filed: Mar. 11, 1974

[21] Appl. No.: 449,789

[52] U.S. Cl. .............. 198/37; 198/202; 198/208; 198/230; 198/188
[51] Int. Cl.² .................. B65G 15/00; B65G 15/30
[58] Field of Search ......... 198/37, 39, 40, 188, 208, 198/229, 230, 202; 177/16, 210

[56] References Cited
UNITED STATES PATENTS

| 897,955 | 9/1908 | Barrett et al. | 198/230 |
|---|---|---|---|
| 2,488,760 | 11/1949 | Brown | 177/16 |
| 2,909,273 | 10/1959 | Smith | 198/202 |
| 2,916,139 | 12/1959 | Murphy | 198/202 |
| 3,331,492 | 7/1967 | Knutson et al. | 198/208 |
| 3,407,673 | 10/1968 | Slezak | 198/202 |
| 3,414,116 | 12/1968 | Oury | 198/230 |
| 3,522,876 | 8/1970 | Purdy | 198/188 |
| 3,679,010 | 7/1972 | Bullivant | 198/39 |
| 3,773,124 | 11/1973 | Bullivant | 177/210 |

*Primary Examiner*—Richard A. Schacher
*Assistant Examiner*—Joseph E. Valenza
*Attorney, Agent, or Firm*—Seidel, Gonda & Goldhammer

[57] ABSTRACT

The endless belt of a gravimetric feeder is provided with a tracking and tensioning assembly which is mounted for rotation about a vertical axis. The assembly is also mounted for movement along said axis between operative and inoperative positions. In the operative position of the assembly, it tensions the belt and instantly corrects any tendency of the belt to move sideways. The assembly also maintains the inner surface of the belt clean by scraping the same when the assembly is in its operative position.

15 Claims, 7 Drawing Figures

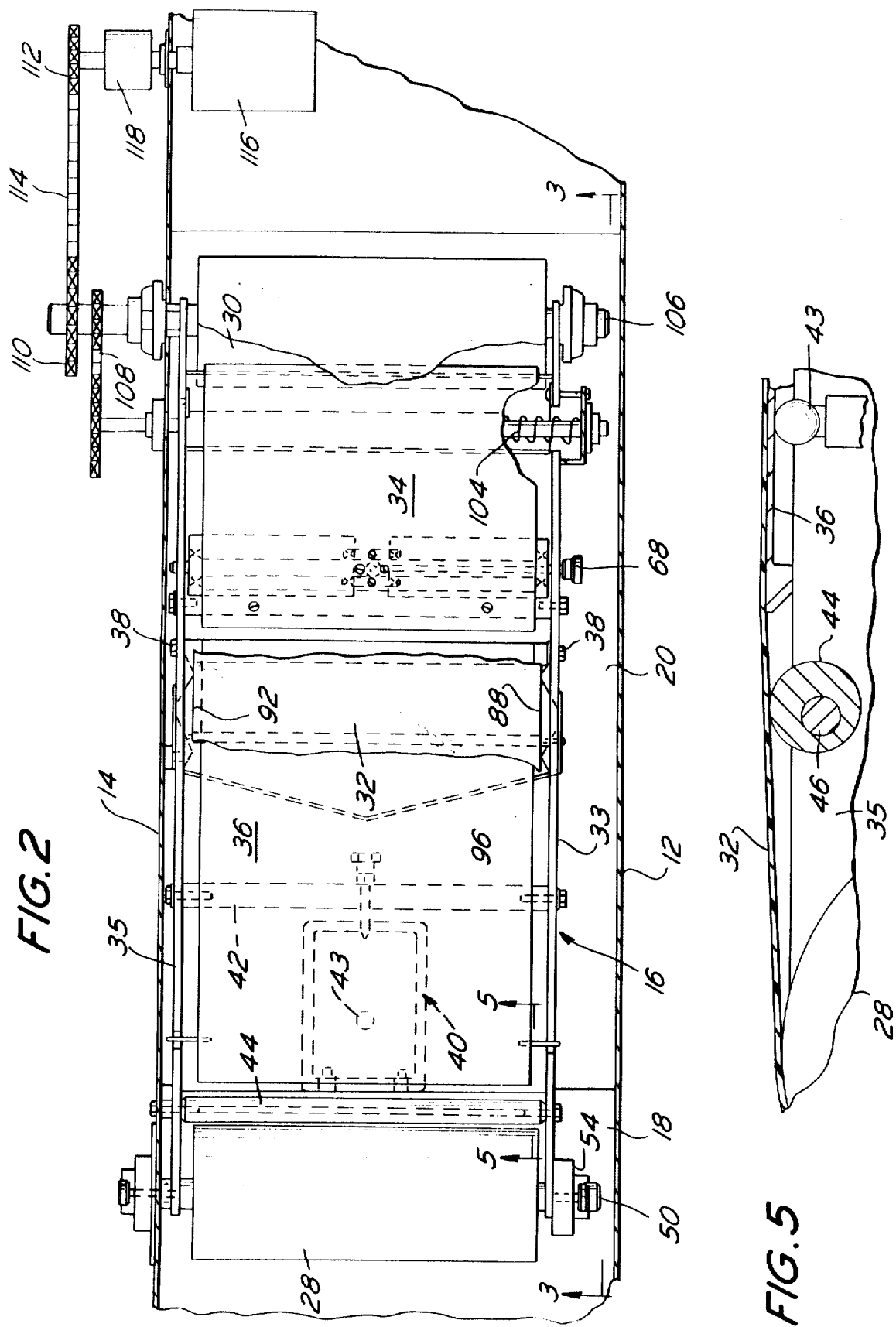

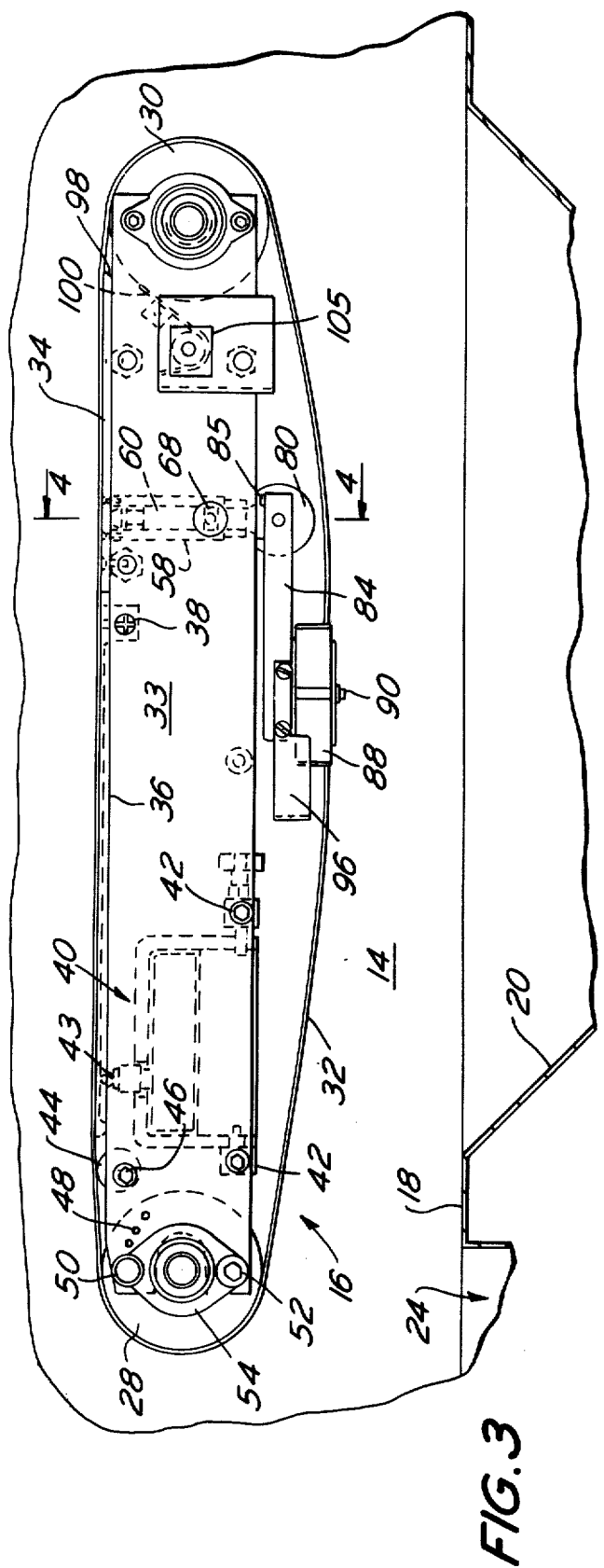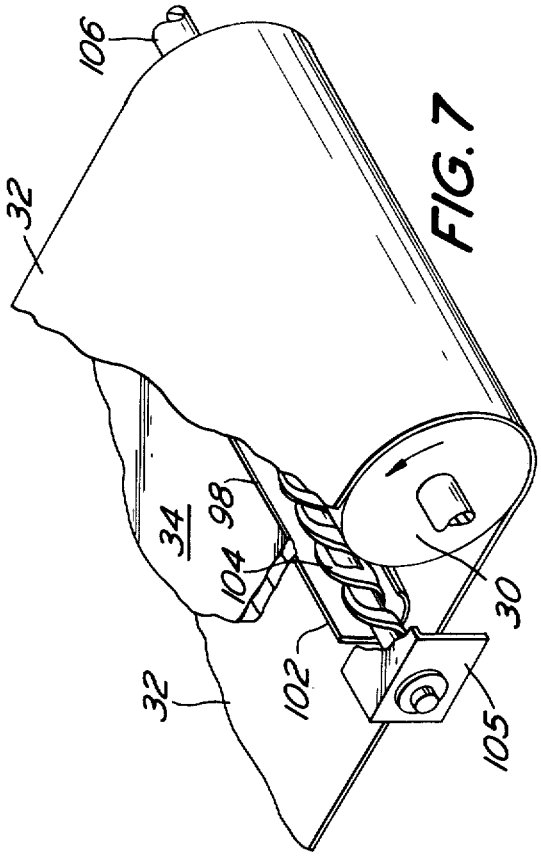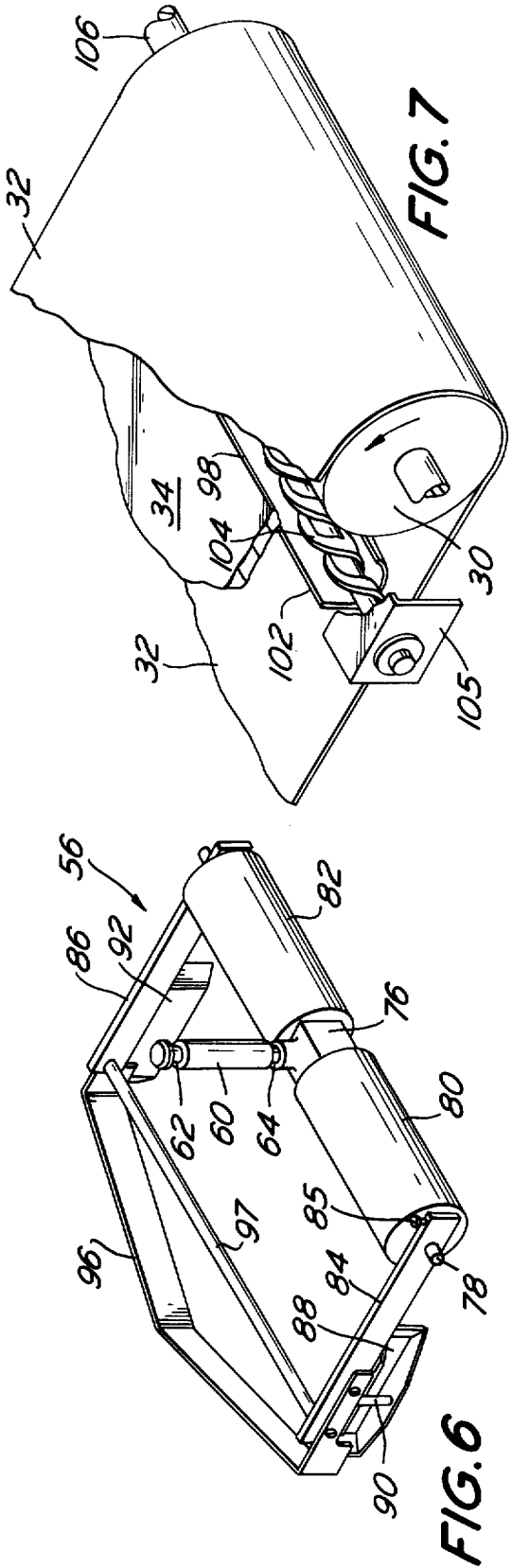

3,944,050

GRAVIMETRIC FEEDER

This invention is directed to mass flow feeder of the gravimetric type such as that disclosed in U.S. Pat. No. 3,679,010 and which may include a digitally controlled electronic load cell of the type disclosed in U.S. Pat. No. 3,773,124. When using feeders of this type, it is desirable to utilize an endless belt which is as thin as possible. The thinner the belt, the more accurate the measurement involved.

The feeder of the present invention is adapted to utilize a belt of reinforced plastic material having a thickness as low as 0.020 inches. When utilizing a thin belt of this nature, there is created tracking and tensioning problems in conjunction with problems associated with maintaining the belt clean. When the material being handled by the belt is of a granular sticky nature, there is a tendency for such material to accumulate on the inner surface of the belt which leads to inaccurate measurements unless such material is removed. In accordance with the present invention, the feeder has a novel tracking and tensioning assembly.

The tracking and tensioning assembly includes at least one and preferably two tracking rollers for correcting any tendency of the belt to move sideways. Said assembly also includes a plow for cleaning the inner surface of the belt. In addition, the entire assembly acts as a counterweight for tensioning the belt. The assembly is mounted for rotation about a vertical axis while at the same time is movable along said axis between operative and inoperative positions. The assembly is structurally interrelated in a manner so as to enable it to track, clean and tension the belt in a manner which is more effective than the devices proposed heretofore.

It is an object of the present invention to provide a gravimetric feeder having a novel tracking and tensioning assembly associated with a thin endless belt for accurately and effectively controlling the belt.

It is another object of the present invention to provide a gravimetric feeder wherein a tracking and tensioning assembly for an endless belt includes a plow for scraping the inner surface of the belt.

It is another object of the present invention to provide a gravimetric feeder with an endless belt tracking and tensioning assembly which is more effective and reliable than devices proposed heretofore.

It is another object of the present invention to provide a gravimetric feeder with a tracking and tensioning assembly capable of being moved between operative and inoperative positions with respect to an endless belt while using only one hand.

It is another object of the present invention to provide a gravimetric feeder having a tracking and tensioning assembly associated with an endless belt whereby the belt cannot be driven until the assembly is moved from its inoperative position to its operative position.

Other objects will appear hereinafter.

For the purpose of illustrating the invention, there is shown in the drawings a form which is presently preferred; it being understood, however, that this invention is not limited to the precise arrangements and instrumentalities shown.

FIG. 2 is a sectional view taken along the line 2—2 in FIG. 1.

FIG. 3 is a sectional view taken along the line 3—3 in FIG. 2.

FIG. 5 is a sectional view taken along the line 5—5 in FIG. 2.

FIG. 6 is a perspective view of the tracking and tensioning assembly.

FIG. 7 is a partial perspective view of one end of the conveyor with structure for cleaning the inner surface of the belt and the outer surface of the drive roller.

Figure 1:
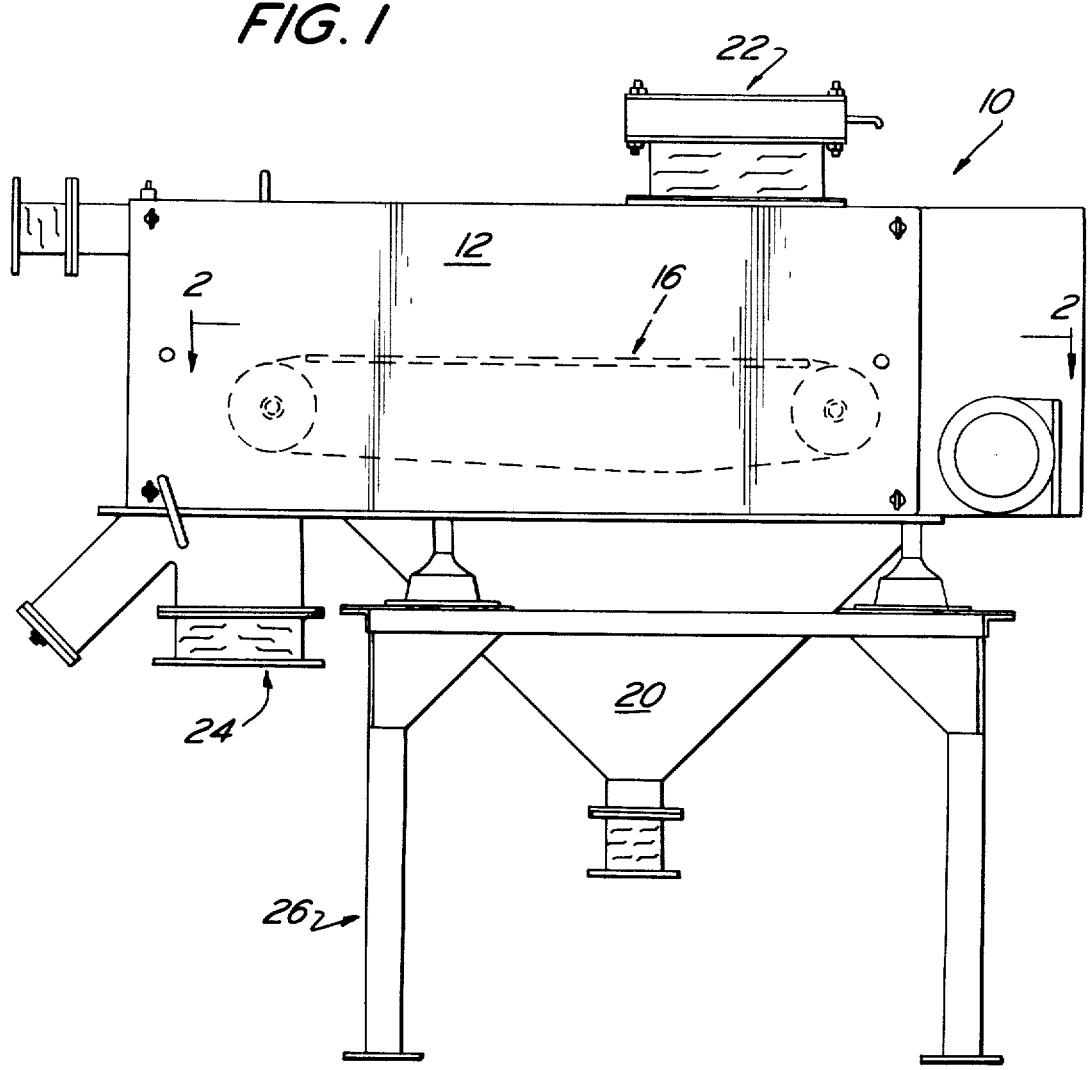
FIG. 1 is a side elevation view of a gravimetric feeder in accordance with the present invention.

Referring to the drawing in detail, wherein like numerals indicate like elements, there is shown in FIG. 1 a gravimetric feeder in accordance with the present invention designated generally as 10. The feeder 10 includes a housing having longitudinally extending sidewalls 12 and 14 connected to a bottom wall 18. A conveyor designated generally as 16 is supported between the walls 12 and 14 and above the wall 18. The bottom wall 18 is provided with a discharge chute 20 for collecting and discharging granular material which is not weighed nor fed to the outlet means 24. The feeder 10 includes an inlet means 22 for introducing granular material to be weighed and conveyed to the outlet means 24. The housing for the feeder 10 includes end walls and a top wall so as to provide a totally enclosed housing.

The conveyor 16 is supported from the housing of the feeder 10 by means not shown and which may be conventional. The conveyor 16 includes an idler roller 28 and a driven roller 30 around which extend an endless belt 32. The belt 32 is preferably a thin belt made from a glass reinforced polymeric plastic material having a thickness of between .020 and .125 inches. The upper run of belt 32 overlies a stationary plate 34 and also overlies a weighing platform 36 mounted pivotable pivotably movement about the axes of aligned pins 38.

The weighing platform 36, adjacent the end thereof remote from pivot pins 38, transmits the load of the granular material being conveyed by belt 32 to a load cell 40. Load cell 40 is preferably an electronic load cell of the type referred to in the aforementioned patents. Load cell 40 is supported between the side frame sections 33, 35 by brackets 42 and has a ball or roller 43 for actuation by platform 36.

The upper surface of the stationary plate 34 defines a horizontal plane coextensive with the upper surface of the weighing platform 36 when the latter is under no load. In order that the belt 32 may lie in that plane without applying any tare weight load to the platform 36, there is provided a shaft 46 having an eccentric roller 44 between the side frame sections 33 and 35. Shaft 46 is located between the idler roller 28 and the load cell 40. The eccentric roller 44 contacts the inner surface of belt 32 and may be manipulated by rotation of shaft 46 to properly orientate the belt 32 so that the belt does not by itself transmit any load to the platform 36. Hence, tare weight data will be simpler to compute and accuracy will be increased.

Each of the side frame sections 33 and 35 is provided with a plurality of holes 48 arranged in an arc about the axis of stud 52. See FIG. 3. The idler roller 28 is provided with bearing housings 54 at its ends. Each bearing housing 54 is pivotably mounted on a stud 52 which in turn is supported by one of the side frame sections 33, 35. A pin, not shown, is connected to knob 50 on each housing 54 and adapted to enter one of the holes 48. In this manner, there is provided a means for gross tensioning of the belt 32. For example, this adjustment may be made to compensate for stretching of the belt It is desirable to provide a feeder 10 constructed in a manner so as to be substantially maintenance free. When the feeder is handling hydroscopic granular material, such as sugar, detergents, fertilizers, etc., it has been common to stop the feeder 10 and clean it every three hours. The granular material tends to accumulate on the inner surface of the belt 32 and on the outer surface of the drive roller 30. Accumulation of material on the belt 32 may introduce errors, especially with very thin belts.

Accordingly, the present invention includes a tracking and tensioning assembly designated generally as 56 which also performs the function of cleaning the inner surface of the belt 32. The assembly 56 immediately counteracts any tendency of the belt to move sideways and also acts as counterweight for tensioning the belt 32.

The assembly 56 is supported by the side frame members 33 and 35 in a manner so that it may rotate about a vertical axis. In this regard, the assembly 56 includes a shaft 60 rotatably received within a sleeve 58 which in turn is supported in depending relation from the stationary plate 34. See FIG. 4.

The shaft 60 is supported for rotation about its axis by the sleeve 58 and is also adapted to reciprocate along its axis. Intermediate its ends, the shaft 60 is provided with annular grooves 62 and 64. When the assembly 56 is in its inoperative disposition, a trigger 66 has one end received within the groove 64. See FIG. 4. Trigger 66 is supported for horizontal movement by the side frame 33 and the sleeve 58.

A spring 70 extends between the side frame 33 and a retainer on the trigger 66 so as to bias the trigger toward the sleeve 58. One end portion of the trigger 60 extends through a hole in the sleeve 58. A knob 68 is provided on the other end of the trigger 66. To cause the assembly 56 to assume its operative disposition, it is only necessary to pull on the knob 68 so as to compress the spring 70 and permit the free end of the trigger 66 to be removed from the groove 64. When this happens, the assembly 56 drops due to its own weight.

It is undesirable to run the feeder 10 with the assembly 56 in its inoperative disposition. Hence, a microswitch 72 has a feeler disposed within the groove 64. So long as this relationship exists, a lamp 74 which is connected to microswitch 72 remains lit thereby indicating that the feeder should not be started. When the assembly 56 descends to an operative position, the feeler on the microswitch 72 is cammed outwardly which in turn interrupts the source of power for the lamp 74. When the assembly 56 is in its operative disposition, the end of trigger 66 and the feeler for microswitch 72 contact the outer peripheral surface of shaft 60 between the grooves 62 and 64.

The groove 62 is a safety groove. If the belt 32 should break while the assembly 56 is in its operative disposition, there is nothing to hold up the assembly 56. As soon as the assembly 56 descends to the point wherein groove 62 is opposite trigger 66, the trigger 66 enters the groove 62 so as to prevent the assembly from falling any further. At the same time, the feeler on the microswitch 72 will enter the groove 62 and cause the lamp 74 to be lit.

The lower end of the shaft 60 is provided with a guide portion 76 which receives a horizontally disposed shaft 78. A pair of tracking rollers 80 and 82 are provided on shaft 78 on opposite sides of the guide portion 76. Each end of each roller is provided with roller bearings.

One end of the shaft 78 is rotatably supported by an arm 84. The other end of shaft 78 is rotatably supported by arm 86. Arm 84 lies within the plane of and below the side frame section 33. Arm 86 is similarly associated with side frame section 35.

The arms 84 and 86 extend from shaft 78 forwardly in the general direction of the idler roller 28. A shoe 88 is pivotably supported on arm 84 for rotation about the axis of pin 90. A similar shoe 92 is rotatably supported by arm 86 for rotation about the axis of pin 94.

The shoes 88 and 92 engage a side edge of the belt 32 in the operative disposition of the assembly 56. The shoes 88 and 92 preferably have a substantial length such as a length of about 3 inches. The shoes 88 and 92 constitute reaction surfaces to rapidly initiate corrective action whenever the belt 32 tends to move sideways. The length of the shoes 88 and 92 prevents any tendency of the belt 32 wrinkling due to contact with either one of the shoes.

A plow 96 which is generally V-shaped is connected to and supported by the arms 84 and 86. The lower edge of plow 96 engages the inner surface of the belt 32 and scrapes off any material which tends to accumulate thereon. Any material scraped off the belt 32 by the plow 96 falls into the chute 20. A brace 97 extends between the arms 84 and 86, adjacent the plow 96, to make the assembly 56 more rigid and to provide a counterweight on the forward end of the assembly 56 tending to cause the arms 84, 86 and plow 96 to pivot about the axis of shaft 78 in a counterclockwise direction in FIG. 3.

Referring to FIGS. 3 and 7, it will be noted that the end of the stationary plate 34 adjacent the drive roller 30 is provided with a scraper edge 98. A trough 102 has a scraper edge 100 adjacent the outer periphery of the roller 30. Any material scraped off the inner surface of the belt 32 by scraper edge 98 or off the roller 30 by scraper edge 100 is received in the trough 102. Any such material is continuously fed through a hole in the side frame section 33 by a feed screw 104 and directed by deflector 105 into the chute 20. The axis of feed screw 104 is parallel to the axis of shaft 106 for the drive roller 30. See FIG. 2. A sprocket on the feed screw 104 is meshed with a chain extending around a sprocket on the shaft 106. The size of the sprockets is chosen so that the speed of the feed screw 104 is approximately ½ the speed of the shaft 106.

The shaft 106 has a sprocket 110 meshed with a chain 114 which extends around a sprocket 112 on the output side of the speed reducer 118 driven by motor 116. Motor 116 is preferably a variable speed motor totally enclosed within a chamber separate and apart from the chamber of the housing containing the conveyor 16.

Figure 4:
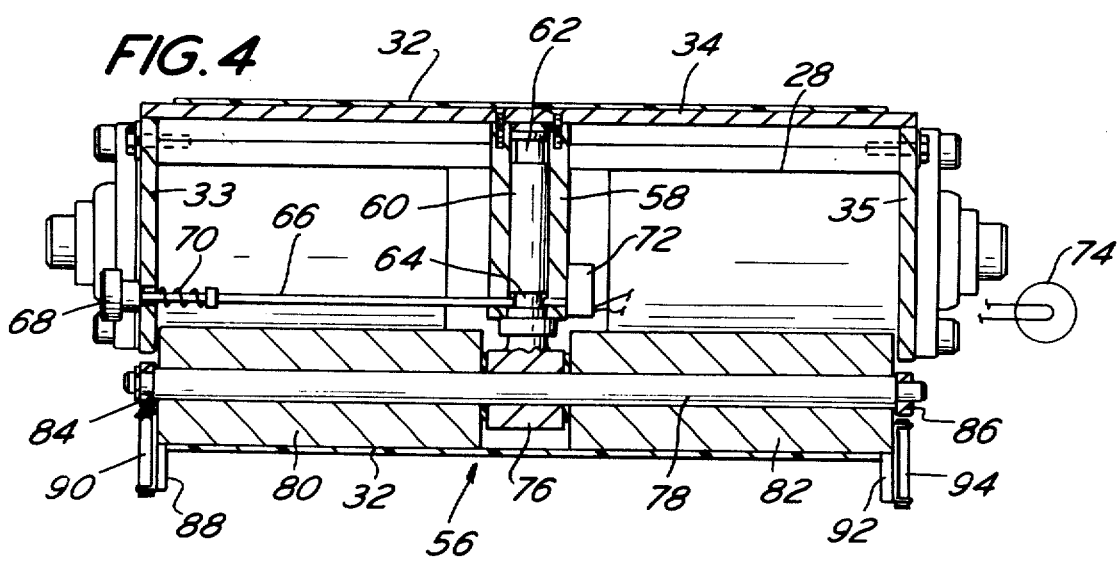
FIG. 4 is a sectional view taken along the line 4—4 in FIG. 3.

In view of the above description, a detailed explanation of operation is not deemed necessary. When the feeder is not in use, the assembly 56 is preferably pushed upwardly by the palm of one hand from an operative position to an inoperative position as shown in FIG. 4. With the assembly 56 in its inoperative position as shown in FIG. 4, there is a droop in the belt 32 as shown in FIG. 3. Also, lamp 74 is lit.

When it is desired to use the feeder 10, it is only necessary to pull out on the knob 68. This causes the assembly 56 to drop due to gravity until the assembly 56 is supported by the lower run of the belt 32. A face of each of the shoes 88 and 92 contacts a side edge of the belt 32. The belt 32 is tensioned by the weight of assembly 56 wherein the portion of the belt 32 between the plow 96 and the rollers 80, 82 is substantially horizontally disposed. Any material on the inner surface of the belt 32 will be scraped off by the plow 96. Plow 96 in conjunction with the scrapers shown in FIG. 7 will enable the feeder 10 to operate in dirty atmospheres for periods of weeks as opposed to the present procedures wherein the feeder must be stopped every 3 hours to perform cleaning maintenance of the belt.

The assembly 56 continuously and automatically tracks the belt 32. Any tendency of the belt 32 to move sideways causes the adjacent shoe to act as a reaction surface to cause the assembly 56 to rotate about the axis of shaft 60 whereby the rollers 82 and 84 introduce counter acting forces to the belt 32 whereby the belt automatically realigns itself. It is believed that the use of two rollers 80, 82 is more effective for steering the belt 32 to cause it to realign itself due to the larger number of roller ends contacting the belt 32.

Thus, it will be seen that the conveyor 16 includes an automatic tracking and tensioning assembly which is rotatable about a vertical axis and movable from operative to inoperative positions along said axis. In addition, the conveyor 16 is substantially self-cleaning so that it may continue to operate 24 hours a day 7 days a week for periods of weeks without stopping the feeder 10 to clean the belt 32. Movement of the assembly 56 from its operative to its inoperative position is easily and quickly attained by the use of one hand. To move the assembly 56 from its operative to its inoperative position, it is only necessary to push upwardly from below the belt 32 with the palm of one's hand until the trigger 66 is received in the groove 64.

As mentioned above, the arms 84 and 86 may pivot about the axis of shaft 78. When the assembly 56 is in its inoperative position, it is preferred to have the arms 84, 86 generally horizontally disposed. An adjustable screw 85 on arm 84 contacts the lower face of side frame section 33 which in turn pivots the arms 84, 86 clockwise in FIG. 3 so that they are generally horizontal.

The present invention may be embodied in other specific forms without departing from the spirit or essential attributes thereof and, accordingly, reference should be made to the appended claims, rather than to the foregoing specification as indicating the scope of the invention.

I claim:

1. A feeder comprising a frame having first and second rollers, an endless belt extending around said rollers, a motor coupled to one of said rollers for driving said belt, a tracking and tensioning assembly, means mounting said assembly between upper and lower runs of said belt for movement in a vertical direction between an upper inoperative position and a lower operative position, said assembly including at least one tensioning roller disposed for rotation about an axis transverse with respect to the lower run of said belt, said tensioning roller being in contact with the juxtaposed inner surface of the lower run of the belt in the operative position of said assembly, said assembly including first and second shoes, each shoe being supported adjacent a different edge of the lower run of the belt, each shoe being rotatable about a vertical axis, said shoes being movable as a unit with said tensioning roller between said operative and inoperative positions of the assembly, said assembly being biased downwardly toward said operative position, and latch means supported by the frame for selectively retaining said assembly in its upper inoperative position.

2. A feeder in accordance with claim 1 wherein said assembly includes a V-shaped plow for engagement with the inner surface of said belt to effect cleaning of said belt surface.

3. A feeder in accordance with claim 1 wherein said shoes are mounted for pivotable movement as a unit about the longitudinal axis of said tensioning roller.

4. A feeder in accordance with claim 1 wherein said assembly includes first and second coaxial rollers supported by said assembly, said rollers being on opposite sides of said axis.

5. A feeder in accordance with claim 3 wherein said assembly includes a plow for contact with said inner surface of the lower run of the belt in the operative position of said assembly.

6. A feeder in accordance with claim 1 including a trough adjacent one of said rollers, a scraper adjacent the periphery of said one roller for scraping material off the periphery of said roller for collection by said trough, a second scraper adjacent said one roller for scraping the inner surface of said belt in a manner so that material scraped off the belt enters said trough, and means for continuously withdrawing collected material from said trough.

7. A feeder comprising a frame having first and second rollers, an endless belt extending around said rollers, a tracking and tensioning assembly, means mounting said assembly between the upper and lower runs of said belt for movement in a vertical direction between an upper inoperative position and a lower operative position, said assembly including at least one roller disposed for rotation about an axis transverse with respect to the lower run of the belt, said roller in contact with the juxtaposed surface of the belt in the operative position of said assembly, said assembly including a plow for scraping said surface of the belt, said assembly including first and second shoes each adjacent a different end of the lower run of the belt, said shoes being rotatable about a vertical axis, said shoes and plow being movable as a unit with said roller between said operative and inoperative positions of the assembly, and latch means supported by the frame for selectively retaining said assembly in its upper inoperative position.

8. A feeder in accordance with claim 7 wherein said plow and shoes are mounted for pivotable movement as a unit about the longitudinal axis of said roller.

9. A feeder in accordance with claim 7 wherein said means mounting said assembly supports the assembly for rotation about a vertical axis.

10. A feeder in accordance with claim 9 wherein said assembly includes two discrete rollers coaxial with one another and disposed on opposite sides of the vertical axis about which the assembly is rotatable.

11. A feeder in accordance with claim 7 wherein said assembly includes a shaft perpendicular to the axis of said roller, means on said shaft for cooperation with said mounting means to retain said assembly in its upper inoperative position, a second discrete means on said shaft for cooperation with said mounting means to limit the descent of said assembly so as to define a lowermost position for the assembly which is below the elevation of the assembly in the operative position of the assembly.

12. A feeder in accordance with claim 7 including means associated with the upper run of said belt for weighing granular material on said belt, a housing enclosing said frame, said housing housing an inlet means and an outlet means for material to be weighed on said belt, and a chute on said housing below said belt for receiving material scraped off the belt by said plow.

13. A feeder in accordance with claim 7 wherein said belt has a thickness between 0.02 and 0.04 inches.

14. A feeder in accordance with claim 7 wherein said mounting means for enabling said assembly to be moved between its operative and inoperative positions includes a spring biased member cooperating with assembly to retain it in its upper inoperative position, and said assembly being gravity biased toward its lower operative position for contact with the inner surface of the lower run of said belt.

15. A feeder in accordance with claim 1 including means associated with the upper run of said belt for weighing granular material on said belt.

* * * * *